United States Patent [19]
Kobayashi et al.

[11] Patent Number: 6,071,991
[45] Date of Patent: Jun. 6, 2000

[54] MODIFIED EPOXY RESIN MODIFIED EPOXY RESIN COMPOSITION AND A PROCESS FOR THE PREPARATION OF THE MODIFIED EPOXY RESIN

[75] Inventors: Yoshikazu Kobayashi; Yojiro Yamamoto, both of Yokkaichi, Japan

[73] Assignee: Shell Oil Company, Houston, Tex.

[21] Appl. No.: 09/010,288

[22] Filed: Jan. 21, 1998

[30] Foreign Application Priority Data

Jan. 21, 1997 [JP] Japan ..................................... 9-041298

[51] Int. Cl.[7] .............................. C08K 5/01; C08L 63/02

[52] U.S. Cl. ........................... 523/463; 525/488; 525/507

[58] Field of Search ............................ 523/463; 525/507, 525/488

[56] References Cited

FOREIGN PATENT DOCUMENTS

| | | | |
|---|---|---|---|
| 3-115318 | 5/1991 | Japan | C08G 18/58 |
| 9-012678 | 1/1997 | Japan | C08G 59/20 |

*Primary Examiner*—Robert Dawson
*Assistant Examiner*—D. Aylward

[57] ABSTRACT

Providing a modified epoxy resin which is suitable for utilized as a coating for repairing, a process for the preparation thereof, and a composition. It is a modified epoxy resin obtained by reacting at least one epoxy resin (a) having at least one or more epoxy groups in a molecule with at least one kind of aliphatic monocarboxylic acid (b) having carbon atoms of 10 to 30 in a molecule in proportion of 20 to 80% by equivalent with respect to the epoxy groups in said epoxy resin, a process for the preparation of said resin by the use of a phosphorus-based catalyst, and a composition comprising said resin and a solvent.

20 Claims, 1 Drawing Sheet

MODIFIED EPOXY RESIN MODIFIED EPOXY RESIN COMPOSITION AND A PROCESS FOR THE PREPARATION OF THE MODIFIED EPOXY RESIN

The present invention relates to a modified epoxy resin which is soluble in a mineral spirit, an epoxy resin composition, and a process for the preparation of the modified epoxy resin. In more detail, the present invention is relates to a modified epoxy resin, a modified epoxy resin composition which can be preferably utilized for a coating which is less harmful to human bodies, high in safeness, and excellent in workability, in particular, for a coating for repainting, and a process for the preparation of the modified epoxy resin.

Conventionally, epoxy resins have been widely employed as a resin for coatings having a corrosion resistance because of excellence in corrosion resistance, chemical resistance, and adhesion. The coatings composed of an epoxy resin have been usually employed by dissolving a solid epoxy resin in a single solvent or solvents mixture selected from aromatic hydrocarbons such as toluene and xylene, ketones such as methylethylketone, alcohols, and glycolethers.

Although the solvents show an excellent solubility for epoxy resins, a solution of the epoxy resin is variously regulated because the solvents are harmful to human bodies, and low in a flash point and boiling point, and it includes a problem in view of safeness and health during working. On the other hand, when it is employed as a coating for repainting, there is a problem that the solvents dissolve or swell an aged coating layer, whereby, it has been problematic that there is caused a defect in a coating layer such as lifting.

Accordingly, it has been proposed that a mineral spirit is employed as a solvent for solving the aforementioned problems, which is almost harmless to human bodies, high in a flash point and boiling point, high in safeness, excellent in health during working and, further, weak in dissolving power.

However, a general epoxy resin has poor solubility in the mineral spirit, as a result, it has been unable to prepare a solution of an epoxy resin and a coating because of muddiness or separation of the solution.

The present invention relates to a modified epoxy resin produced by reacting at least one epoxy resin (a) having at least one epoxy group in a molecule and at least one aliphatic monocarboxylic acid (b) having carbon atoms of 10 to 30 in a molecule in proportion of 20 to 80% by equivalent with respect to the epoxy groups in said epoxy resin.

It has been found that there can be obtained a modified epoxy resin for a coating and a composition which are soluble in a mineral spirit, high in safeness, and excellent in workability during coating and, further, low in viscosity and capable of contributing to a decrease of VOC, by the use of a modified epoxy resin obtained by reacting an epoxy resin with an aliphatic monocarboxylic acid in a specified proportion, and the present invention was completed.

The epoxy resin employed in the present invention may usually be a monomer or a compound having a high molecular weight which may be saturated or unsaturated, and aliphatic, alicyclic, aromatic, or heteroaromatic, and which includes epoxy groups, and may be optionally substituted by other substituent groups such as hydroxyl group, alkoxyl group, and halogen atoms. An appropriate epoxy resin (a) preferably includes a reaction product of a polyphenol with an epihalohydrin, a reaction product of a polyalcohol with an epihalohydrin, a reaction product of a polycarboxylic acid with an epihalohydrin, and a mixture thereof, and particularly, a reaction product of a polyphenol with an epihalohydrin is preferred. As the epoxy resin (a), there are typically exemplified, for example, bisphenol A type epoxy resins which are commercially supplied by trade names such as Epikote 828, Epikote 836, Epikote 1001,and Epikote 1004. which are manufactured by Yuka Shell Epoxy K.K., bisphenol F type epoxy resins which are commercially supplied by trade names such as Epikote 807 and Epikote 806. which are manufactured by Yuka Shell Epoxy, Ltd.

In the present invention, a particularly preferred epoxy resin (a) is a polyglycidylether of a novolak type phenol resin which can be obtained by a condensation reaction of a phenol or a polyvalent phenol with aldehydes and, more particularly preferred a polyglycidylether of an orthocresol novolak and a polyglycidylether of a bisphenol A novolak type. Although as the epoxy resin (a), although there are typically exemplified, Epikote 180S65, Epikote 180S70, Epikote 157S65, and Epikote 157S70 which are manufactured by Yuka Shell Epoxy K.K., t should not be limited to use others than those. Also, the aforementioned epoxy resin (a) may be employed solely or in combination of two or more kinds. In the case that it does not contain at least one epoxy group in a molecule, an effect for modifying becomes low because of too small amount of epoxy groups to react with a monocarboxylic acid.

As the aliphatic monocarboxylic acid (b) having a carbon number of 10 to 30 to be employed in the present invention, although not particularly limited, for example, there are exemplified a saturated aliphatic monocarboxylic acid such as pelargoic acid, decanoic acid, lauric acid, mystiric acid, palmitic acid, and stearic acid, an unsaturated aliphatic monocarboxylic acid such as oleic acid, licinoleic acid, linoleic acid, eleostearic acid, etc., fatty acids from animals or vegetable oils such as fatty acid from a castor oil, fatty acid from a coconut oil, fatty acid from a linseed oil, fatty acid from a palm oil, fatty acid from a safflower oil, fatty acid from a soybean oil, fatty acid from a paulownia oil, fatty acid from a tall oil, and dehydrated fatty acid from a castor oil. In the case that a carbon number is less than 10, solubility in a mineral spirit is not sufficiently improved. Also, in the case that a carbon number is more 30, a cured coating layer unpreferably becomes soft. As the preferred aliphatic monocarboxylic acid, oleic acid, tall oil, and fatty acid from a linseed oil are suitable from a viewpoint of availability at a low price. The aforementioned aliphatic monocarboxylic acid may be employed solely or in combination of two or more kinds, and the use amount is selected in a range from 20 to 80% by equivalent, preferably from 35 to 65% by equivalent, and more preferably from 40 to 60% by equivalent based on epoxy groups in the aforementioned epoxy resin (a). In the case that the use amount is less than 20% by equivalent, solubility in a mineral spirit is not sufficiently improved and, in the case that it exceeds 80% by equivalent, there increase molecular species not having epoxy groups in the epoxy resin, resulting in a cause for tendency to deteriorate the properties in a cured coating layer.

The mineral spirit to be employed in the present invention is a petroleum-based hydrocarbon solvent which is a distillate from heavy-quality petroleum, for example, it includes LAWS, HAWS, and V-LAWS, etc., which are commercially supplied by Shell Japan, Co. Ltd. Further, although the use amount is not particularly limited, it ranges from 30 to 95% by weight as solids, preferably from 40 to 90% by weight, and more preferably from 50 to 90% by weight based on the aforementioned epoxy resins. In the case of not more than 30% by weight, the solid content in a coating is unpractically low and, in the case of not less than 95% by weight, handling is unpreferably difficult.

It is to be noted that although the mineral spirit may be solely employed, it may also be optionally employed together with a small amount of organic solvents generally used such as normal butanol, isobutanol, toluene, methylethylketone, and methylisobutylketone.

The modified epoxy resin of the object of the present invention can be readily prepared by reacting at least one epoxy resin (a) having at least one or more epoxy groups in a molecule with at least one kind of aliphatic monocarboxylic acid (b) having carbon atoms of 10 to 30 in a molecule in proportion of 20 to 80% by equivalent with respect to the epoxy groups in said epoxy resin in the presence of a phosphorus-based catalyst.

Although the reaction temperature and reaction time are not particularly limited, the reaction is carried out at a temperature of from 80 to 200° C., and preferably from 100 to 180° C. in a sufficient time for which a desired reaction is completed, appropriately from 0.25 to 8 hours, more appropriately from 0.5 to 6 hours, and preferably from 1 to 4 hours. For the completion of the reaction, there is required a long reaction time at a low temperature or a short reaction time at a high temperature. In case of a temperature exceeding 200° C. and a long reaction time, undesired reactions occur, and at a temperature of lower than 80° C., there is unpreferably required a very long reaction time. The reaction can be carried out at an appropriate pressure from a reduced pressure to a compressed pressure, and preferably at an atmospheric pressure.

The phosphorus-based catalyst employed herein is not particularly limited, for example, there are exemplified salts of quaternary phosphonium such as benzyltriphenyl phosphonium chloride, ethyltriphenyl phosphonium iodide, butyltriphenyl phosphonium bromide, ethyltriphenyl phosphonium chloride, and tetrabutyl phosphonium hydroxide, tertiary phosphines such as triphenylphosphine, and tributylphosphine. The catalysts may be employed solely or in combination of two or more kinds.

The amount of the catalysts to be employed can be properly selected in a range from 5 ppm to 5% by weight, preferably from 20 to 800 ppm based on the epoxy resin (a) depending upon the kind of the catalyst. Also, as the catalysts for the reaction, although there can be employed in order to manufacture even a basic catalyst such as sodium hydroxide, and potassium hydroxide, and salts of quaternary ammonium such as tetramethylammonium bromide, it is not preferred a modified epoxy resin which is manufactured by the use of the catalysts and a composition therefrom in view of storage stability.

Although the process for the preparation of the present invention may be carried out in the presence of the mineral spirit, it may be also carried out even in the absence of it.

EXAMPLES

Hereinafter, the present invention is illustrated in more detail based on Examples and Comparative Examples.

Example 1

A reaction vessel equipped with a thermometer and an agitating apparatus was charged with 360 g (1.72 equivalent) of a bisphenol A novolak type epoxy resin having an epoxy equivalent of 209 and 230 g (0.84 equivalent) of a fatty acid from a tall oil. There was added 0.14 g of ethyltriphenyl phosphonium iodide as a catalyst after elevating a temperature to 110° C. while agitating, followed by elevating the temperature to 160° C. to allow to react for 3 hours. A modified epoxy resin obtained showed an epoxy equivalent of 685 and a weight average molecular weight of 4700. Results are shown in FIG. 1 in which a product is analyzed by infrared absorption spectra. In the Figure, there are not observed an absorption (910 cm-1) by an epoxy group and an absorption (1710 cm-1) by the fatty acid, and there is observed an absorption (1740 cm-1) by ester, whereby, there is clarified formation of esters by the reaction of epoxy groups with the fatty acid, and clarified that the product is a reaction product of the epoxy resin with the fatty acid from the tall oil.

Example 2

A reaction vessel equipped with a thermometer and an agitating apparatus was charged with 300 g (1.41 equivalent) of an orthocresol novolak epoxy resin having an epoxy equivalent of 213, 60 g (0.32 equivalent) of a bisphenol A type epoxy resin having an epoxy equivalent of 186, and 238 g (0.84 equivalent) of a fatty acid from a tall oil. There was added 0.14 g of ethyltriphenyl phosphonium bromide as a catalyst after elevating a temperature to 100° C. while agitating, followed by further elevating the temperature to 160° C. to allow to react for 3 hours. A modified epoxy resin obtained showed an epoxy equivalent of 686 and a weight average molecular weight of 2200.

Example 3

A reaction vessel equipped with a thermometer and an agitating apparatus was charged with 300 g (1.41 equivalent) of an orthocresol novolak epoxy resin having an epoxy equivalent of 213, 60 g (0.32 equivalent) of a bisphenol A type epoxy resin having an epoxy equivalent of 186, and 238 g (0.84 equivalent) of oleic acid. There was added 0.14 g of ethyltriphenyl phosphonium bromide as a catalyst after elevating a temperature to 100° C. while agitating, followed by further elevating the temperature to 160° C. to allow to react for 3 hours. A modified epoxy resin obtained showed an epoxy equivalent of 724 and a weight average molecular weight of 2340.

Example 4

A reaction vessel equipped with a thermometer and an agitating apparatus was charged with 240 g (1.12 equivalent) of a bisphenol A novolak type epoxy resin having an epoxy equivalent of 209, 100 g (0.54 equivalent) of a bisphenol A type epoxy resin having an epoxy equivalent of 186, and 232 g (0.82 equivalent) of a fatty acid from a tall oil. There was added 0.14 g of ethyltriphenylphosphonium iodide as a catalyst after elevating a temperature to 100° C. while agitating, followed by further elevating the temperature to 160° C. to allow to react for 3 hours. A modified epoxy resin obtained showed an epoxy equivalent of 689 and a weight average molecular weight of 3160.

Examples 5 to 8

A mineral spirit was added to the respective modified epoxy resins obtained in the Examples 1 to 4 to dissolve at 100° C. for 30 minutes, so that solid content is adjusted to 10% by weight, 30% by weight, 60% by weight, and 90% by weight, respectively.

There were homogeneous all the solutions of the mineral spirit having the respective concentrations.

Comparative Examples 1 to 3

It was tried to dissolve a standard type bisphenol A epoxy resin (Epikote 828), a standard type orthocresol novolak epoxy resin (Epikote 180S65), and a standard type bisphenol A novolak epoxy resin (Epikote 157S70) which are manufactured by Yuka Shell Epoxy, K.K. by the same procedures as in Examples 5 to 8. All resins were heterogeneously separated.

Table 1 shows the properties of the epoxy resins in the above Examples and Comparative Examples and test results relating to storage stability in the mineral spirit solutions.

TABLE 1

|  | Example 5 | Example 6 | Example 7 | Example 8 | Comparative Example 1 | Comparative Example 2 | Comparative Example 3 |
|---|---|---|---|---|---|---|---|
| Kind of Epoxy resin | Example 1 | Example 2 | Example 3 | Example 4 | Epikote 828 | Epikote 180S65 | Epikote 180S70 |
| Epoxy equivalent | 685 | 686 | 724 | 689 | 186 | 213 | 209 |
| Weight average molecular weight | 4700 | 2200 | 2340 | 3160 | 390 | 1190 | 2120 |
| Solution viscosity Note 1 | Y– | O+ | O–R | K–L | Separated | Separated | Separated |
| Storage stability Note 2 |  |  |  |  |  |  |  |
| 90% | ○ | ○ | ○ | ○ | — | — | — |
| 60% | ○ | ○ | ○ | ○ | — | — | — |
| 30% | ○ | ○ | ○ | ○ | — | — | — |
| 10% | ○ | ○ | ○ | ○ | — | — | — |

(Note 1) Solution viscosity

Resinous solutions, in which 40 parts by weight of a mineral spirit (LAWS manufactured by Shell Japan, Ltd.) was added to respective 60 parts by weight of the modified epoxy resins obtained in the respective Examples and the standard type epoxy resins to dissolve at 100° C. for 30 minutes, were placed in a water bath thermostatically-controlled at 25° C. for 30 minutes, followed by being measured comparing with standard tubes for Gardner's Viscosity.

(Note 2)

There were settled mineral spirit solutions having respective concentrations obtained in the Examples 5 to 8 and Comparative Examples 1 to 3 at 5° C. for 1 week, and the presence or absence of separations was judged.

○: no separation

According to the present invention, there can be provided a modified epoxy resin and a composition having a remarkably excellent compatibility between an epoxy resin and a mineral spirit, and as a result, which is suitable for manufacturing a coating which is less harmful to human bodies, high in safeness, and excellent in workability.

Figure 1:
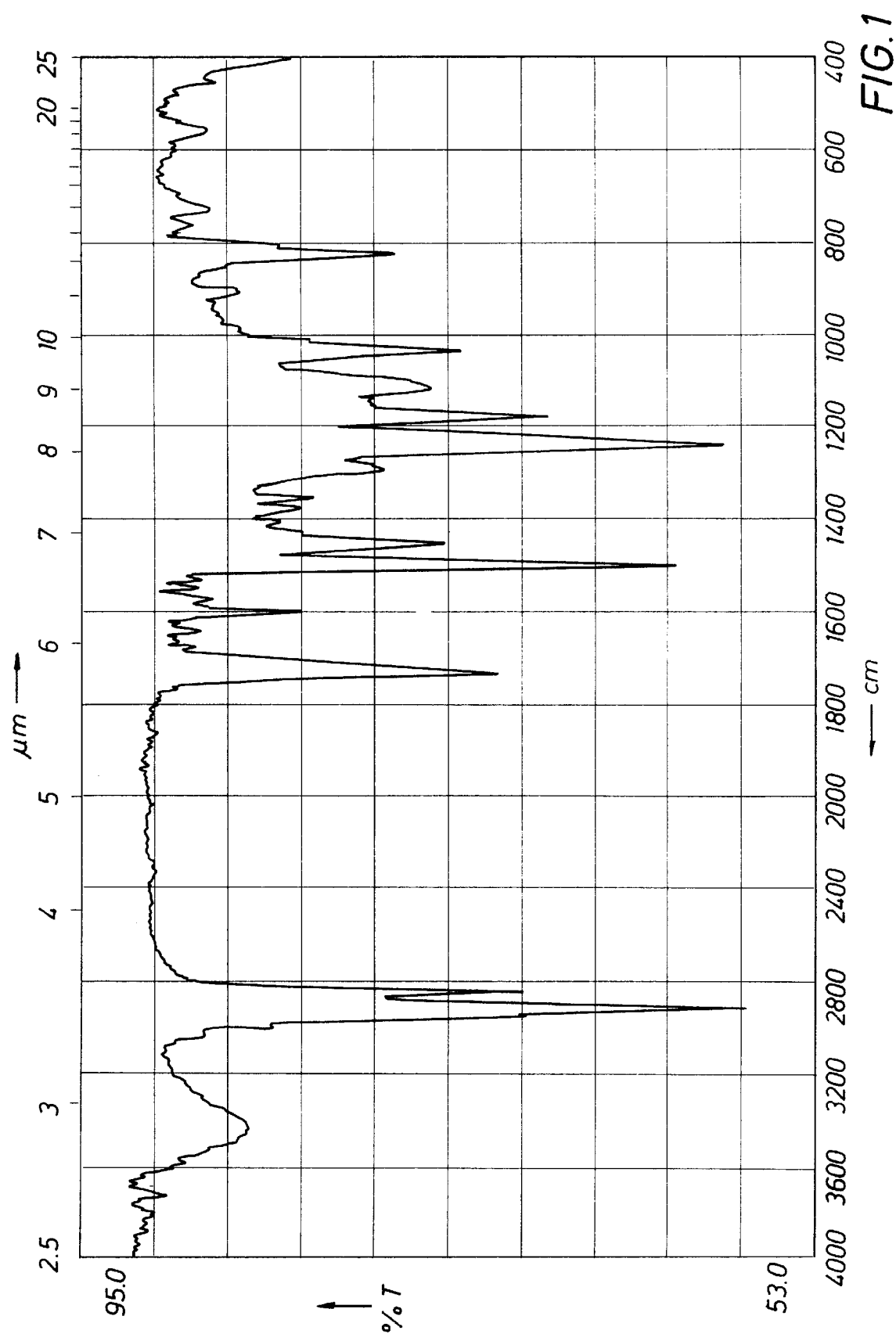
FIG. 1

It is an infrared absorption spectrum chart which shows that the modified epoxy resin of the present invention is not a mixture composed of an epoxy resin and an aliphatic monocarboxylic acid which are raw materials, and it is a resin formed by a reaction.

We claim:

1. A modified epoxy resin produced by reacting at least one epoxy resin (a) having at least one epoxy group in a molecule and at least one aliphatic monocarboxylic acid (b) having 10 to 30 carbon atoms in a molecule in proportion of 35% to 65% acid groups by equivalent with respect to the epoxy groups in said epoxy resin.

2. The modified epoxy resin of claim 1, wherein the at least one epoxy resin (a) is a polyglycidylether of a novolak type phenol resin.

3. A composition comprising:

a modified epoxy resin produced by reacting at least one epoxy resin (a) having at least one epoxy group in a molecule and at least one aliphatic monocarboxylic acid (b) having 10 to 30 carbon atoms in a molecule in proportion of 35% to 65% acid groups by equivalent with respect to the epoxy groups in said epoxy resin; and a mineral spirit in an amount to produce a solid content of 30 to 95 percent by weight.

4. The composition of claim 3, wherein the at least one epoxy resin (a) is a polyglycidylether of a novolak type phenol resin.

5. The modified epoxy resin of claim 2, wherein the epoxy resin (a) is a polyglycidylether of a novolak type phenol resin and a bisphenol A type epoxy resin.

6. The modified epoxy resin of claim 1, wherein the aliphatic monocarboxylic acid is a saturated aliphatic monocarboxylic acid selected from the group consisting of pelargoic acid, decanoic acid, laureic acid, mystiric acid, palmitic acid, stearic acid and combinations thereof.

7. A process for the preparation of a modified epoxy resin comprising reacting an epoxy resin (a) having at least one epoxy group in a molecule with at least one aliphatic monocarboxylic acid (b) having 10 to 30 carbon atoms in a molecule in proportion of 35% to 65% acid groups by equivalent with respect to the epoxy groups in said epoxy resin in the presence of a phosphorus-based catalyst.

8. The modified epoxy resin of claim 1, wherein the aliphatic monocarboxylic acid is an unsaturated aliphatic monocarboxylic acid selected from the group consisting of oleic acid, licinoleic acid, limoleic acid, eleostrearic acid, fatty acid from a safflower oil, fatty acid from a castor oil, fatty acid from a coconut oil, fatty acid from a linseed oil, fatty acid from a palm oil, fatty acid from a soybean oil, fatty acid from a paulownia oil, fatty acid from a tall oil, dehydrated fatty acid from a castor oil, and combinations thereof.

9. The modified epoxy resin of claim 1, wherein the proportion is 40% to 60% acid groups by equivalent with respect to the epoxy groups in said epoxy resin.

10. The composition of claim 3, wherein the epoxy resin (a) is a polyglycidylether of a novolak type phenol resin and a bisphenol A type epoxy resin.

11. The composition of claim 3, wherein the aliphatic monocarboxylic acid is a saturated aliphatic monocarboxylic acid selected from the group consisting of pelargoic acid, decanoic acid, laureic acid, mystiric acid, palmitic acid, stearic acid and combinations thereof.

12. The composition of claim 3, wherein the aliphatic monocarboxylic acid is an unsaturated aliphatic monocarboxylic acid selected from the group consisting of oleic acid, licinoleic acid, limoleic acid, eleostrearic acid, fatty acid from a safflower oil, fatty acid from a castor oil, fatty acid from a coconut oil, fatty acid from a linseed oil, fatty acid from a palm oil, fatty acid from a soybean oil, fatty acid from a paulownia oil, fatty acid from a tall oil, dehydrated fatty acid from a castor oil, and combinations thereof.

13. The composition of claim 3, wherein the in proportion is 40% to 60% acid groups by equivalent with respect to the epoxy groups in said epoxy resin.

14. The process of claim 7, wherein the epoxy resin (a) is a polyglycidylether of a novolak type phenol resin.

15. The process of claim 7, wherein the epoxy resin (a) is a polyglycidylether of a novolak type phenol resin and a bisphenol A type epoxy resin.

16. The process of claim 7, fuirther comprising dissolving the modified epoxy resin in a mineral spirit in an amount to produce a solid content of 30 to 95 percent by weight.

17. The process of claim 7, wherein the aliphatic monocarboxylic acid is a saturated aliphatic monocarboxylic acid selected from the group consisting of pelargoic acid, decanoic acid, laureic acid, mystiric acid, palmitic acid, stearic acid and combinations thereof.

18. The process of claim 7, wherein the aliphatic monocarboxylic acid is an unsaturated aliphatic monocarboxylic acid selected from the group consisting of oleic acid, licinoleic acid, limoleic acid, eleostrearic acid, fatty acid from a safflower oil, fatty acid from a castor oil, fatty acid from a coconut oil, fatty acid from a linseed oil, fatty acid from a palm oil, fatty acid from a soybean oil, fatty acid from a paulownia oil, fatty acid from a tall oil, dehydrated fatty acid from a castor oil, and combinations thereof.

19. The process of claim 7, wherein the phosphorus-based catalyst is selected from the group consisting of salts of quaternary phosphonium, salts of tertiary phosphines, and combinations thereof.

20. The process of claim 7, wherein the in proportion is 40% to 60% acid groups by equivalent with respect to the epoxy groups in said epoxy resin.

\* \* \* \* \*